US011405882B2

(12) United States Patent
Mallart et al.

(10) Patent No.: US 11,405,882 B2
(45) Date of Patent: Aug. 2, 2022

(54) WIRELESS COMMUNICATION SYSTEM COMPRISING A PHYSICAL CHANNEL FOR OVERALL RANDOM ACCESS IN TIME AND SPACE

(71) Applicant: SIGFOX, Labege (FR)

(72) Inventors: Raoul Mallart, Paris (FR); Benoit Ponsard, Toulouse (FR); Arnaud Mansuy, Toulouse (FR)

(73) Assignee: SIGFOX

( * ) Notice: Subject to any disclaimer, the term of this patent is extended or adjusted under 35 U.S.C. 154(b) by 340 days.

(21) Appl. No.: 16/603,147

(22) PCT Filed: Mar. 30, 2018

(86) PCT No.: PCT/FR2018/050797
§ 371 (c)(1),
(2) Date: Oct. 4, 2019

(87) PCT Pub. No.: WO2018/185407
PCT Pub. Date: Oct. 11, 2018

(65) Prior Publication Data
US 2021/0385780 A1 Dec. 9, 2021

(30) Foreign Application Priority Data

Apr. 5, 2017 (FR) ...................................... 1752978

(51) Int. Cl.
*H04W 4/70* (2018.01)
*H04W 64/00* (2009.01)
*H04W 74/08* (2009.01)

(52) U.S. Cl.
CPC ....... *H04W 64/00* (2013.01); *H04W 74/0833* (2013.01); *H04W 74/0866* (2013.01)

(58) Field of Classification Search
None
See application file for complete search history.

(56) References Cited

U.S. PATENT DOCUMENTS

2018/0098356 A1 4/2018 Li et al.
2019/0053285 A1* 2/2019 Martin .................. H04W 88/02
(Continued)

FOREIGN PATENT DOCUMENTS

WO 2016171731 10/2016

OTHER PUBLICATIONS

International Search Report, International Application No. PCT/FR2018/050797, dated Jun. 5, 2018.

*Primary Examiner* — Ajit Patel
(74) *Attorney, Agent, or Firm* — Perman & Green, LLP

(57) ABSTRACT

A wireless communication system including a cellular access network connected to a cellular network core, the cellular access network including cellular base stations adapted to exchange data with terminals on physical channels, called coordinated access channels, each cellular base station serving a geographical area, all the geographical areas served by the cellular base stations forming a geographical region. The wireless communication system includes random access base stations serving the geographical region, each random access base station being adapted to receive data emitted by terminals on a permanent physical channel, called random access channel, the permanent physical random access channels of the random access base stations using the same radio resources throughout the geographical region.

12 Claims, 2 Drawing Sheets

(56) References Cited

U.S. PATENT DOCUMENTS

2019/0104435 A1* 4/2019 Cho .................. H04W 36/0022
2019/0260707 A1* 8/2019 Kesavan ............... H04L 67/025
2020/0296749 A1* 9/2020 Freda .................... H04L 47/286

* cited by examiner

WIRELESS COMMUNICATION SYSTEM COMPRISING A PHYSICAL CHANNEL FOR OVERALL RANDOM ACCESS IN TIME AND SPACE

CROSS REFERENCE TO RELATED APPLICATIONS

This application is a National Stage of International Application No. PCT/FR2018/050797, having an International Filing Date of 30 Mar. 2018, which designated the United States of America, and which International Application was published under PCT Article 21(2) as WO Publication No. 2018/185407 A1, which claims priority from and the benefit of French Patent Application No. 1752978, filed on 5 Apr. 2017, the disclosures of which are incorporated herein by reference in their entireties.

BACKGROUND

1. Field

The presently disclosed embodiment relates to the field of wireless communication systems, and relates more specifically to using cellular access networks for Machine-to-Machine (M2M)-type or of the Internet of Things (IoT)-type applications.

2. Brief Description of Related Developments

In the context, for example of the IoT, each everyday commonplace object is designed to become a communicating object, and is, for this purpose, equipped with a terminal adapted to emit data sent to a radio access network of a wireless communication system.

In such a context, it is important to have solutions which are both low cost (therefore low complexity) and, at the same time, low electrical energy consumers. This makes it possible, for example, to make a lot of everyday commonplace objects communicative, without impacting on the production cost thereof significantly, and in particular without impacting too much on the autonomy thereof when they are battery-operated.

Today, numerous wireless communication systems called "cellular" systems are known, such as GPRS, EDGE, UMTS, HSPA, HSPA+, LTE, CDMA2000 wireless communication systems, etc., which are currently implemented mainly for applications of the Human-to-Human (H2H)-type. Such cellular wireless communication systems, further to them already being massively deployed, have the advantage of offering variable flows which could be very high, and to use reserved frequency bands which guarantee them a low level of interference, such that it is natural to seek to reuse them also for applications of the M2M and/or IoT type.

Conventionally, a cellular wireless communication system comprises a cellular access network comprising a plurality of cellular base stations. Each cellular base station serves a predetermined geographical area, also known by the name "cell", and the grouping of all of the geographical areas served by the cellular base stations forms a geographical region. A cellular access network is of the Wireless Wide Area Network (or WWAN) type, i.e. that the geographical region served is of a significant area, typically greater than 10000 $km^2$, even greater than 50000 $km^2$.

In such cellular wireless communication systems, data exchanges between a terminal and the cellular access network are made on physical channels with access called coordinated access channels, i.e. that it is the cellular access network which decides when and with which radio resource, the terminal can exchange data with said cellular access network. The general procedure for a terminal to be able to exchange data with the access network, on an upload link and/or a download link, therefore consists of making a prior radio resource request to the cellular access network which responds here by indicating the radio resource to be used. At the end of the data exchange, the radio resource is released to be able to be used by other terminals.

In order to make it possible for each terminal to indicate to the cellular access network that it is sought to emit data on the upload link, for example, in the case where said terminal seeks to make an outgoing call, each cellular base station implements a physical access channel called physical random access channel (or PRACH). A physical random access channel corresponds to a radio resource which is reserved over a predetermined time interval and which can be used by any terminal to emit a random access message by which a terminal is indicated to the cellular base station.

Before emitting the random access message, a terminal must listen to a physical diffusion channel of the cellular base station which makes it possible for said terminal to be temporally synchronised with said cellular base station, and which also makes it possible to learn the different parameters of the physical random access channel of the cellular base station (time location of the time interval and radio resource reserved for random access messages). After having emitted the random access message, it is followed by an exchange of several messages between the cellular base station and said terminal before reserving the radio resource, aiming in particular to identify said terminal.

In order to make it possible for a terminal to receive an incoming call, each terminal must, in principle, be connected to a cellular base station in the geographical area of which said terminal is located. A cellular wireless communication system comprises a cellular location server storing, for each terminal, location information representative of the position of said terminal with respect to the cellular access network, for example in the form of an identifier of the last cellular base station to which said terminal is connected. In case of incoming call sent to a terminal, the location information makes it possible to know which cellular base station must be used to notify this incoming call to said terminal, on a physical channel called "paging" channel. After having been notified of an incoming call, a terminal rolls out the steps described above to reserve a radio resource to be able to respond to this incoming call.

The mobility of the terminals is managed by way of different procedures, of which the main ones are known by the name, "cell reselection" and "location update".

To implement these different procedures, the terminal must be regularly indicated to the cellular access network, in the same way as in the case of an outgoing call, i.e. by emitting a random access message on the physical random access channel. These procedures are generally initiated when the terminal detects that it is moved, for example by listening to the cellular access network and by determining that it is now closer than a cellular base station different from the cellular base station to which it is connected.

If the different procedures described above are perfectly well understood and adapted for applications of the H2H type, which require, in particular, very short delays to establish incoming calls, they have proved to be not very suitable for applications of the M2M type. Indeed, these procedures require an increased electrical consumption (to listen regularly to the cellular access network, to reserve radio resources, etc.), which has proved to be too high for M2M-type applications.

In order to adapt the current cellular wireless communication systems, in particular Long Term Evolution (LTE) systems, various approaches are considered.

A first approach, known by the name of Extended Discontinuous Reception (eDRX) makes it possible for a terminal to indicate to the cellular access network that it will only listen to the physical "paging" channel with a predetermined period. Such arrangements make it possible to reduce the electrical consumption linked to listening to the physical "paging" channel, but considerably increase the delay for establishing an incoming call.

A second approach, known by the name of Power Sleep Mode (PSM) consists of making it possible for the terminal to pass into standby mode for a significant duration, while conserving the connection of said active terminal on the side of the cellular access network. Thus, when the terminal leaves the standby mode, it must not necessarily be connected again to the cellular access network, since the connection thereof has been conserved. Such arrangements make it possible to reduce the electrical consumption of the terminal, which can thus remain in standby mode for a long time, but which pose problems in managing the mobility of the terminal, since the connection remains active if the terminal is moved into a geographical area served by another cellular base station.

SUMMARY

The presently disclosed embodiment aims to overcome all or some of the limitations of the solution of the prior art, in particular those outlined above, by proposing a solution which makes it possible to reduce the quantity of operations to be carried out by a terminal to be indicated in a wireless communication system comprising a cellular access network.

Furthermore, the presently disclosed embodiment also aims to propose a solution which makes it possible, at least in some methods of implementation, to reduce the quantity of messages to exchange to manage the mobility of a terminal with respect to a cellular access network.

To this end, and according to a first aspect, of the disclosed embodiment relates to a wireless communication system comprising a cellular access network connected to a cellular network core, said cellular access network comprising cellular base stations adapted to exchange data with terminals on physical coordinated access channels, each cellular base station serving a geographical area, all of the geographical areas served by said cellular base stations forming a geographical region served by said cellular access network. Furthermore, the wireless communication system comprises base stations called random access base stations serving the geographical region served by the cellular access network, each random access base station being adapted to receive data emitted by terminals on a permanent physical random access channel, the permanent physical random access channels using one same radio resource throughout the geographical region.

Thus, the physical random access channel is permanent, i.e. that it exists continuously, without interruption, contrary to the cellular wireless communication systems of the prior art, wherein the physical random access channel is limited to a time interval of limited duration. No time synchronisation is therefore necessary to emit on a random access message, since it is possible to emit at any moment on said permanent physical random access channel.

Furthermore, all the permanent physical random access channels use the same radio resource (frequency band or sub-band, spreading and/or scrambling code, etc.) in the geographical region, contrary to the current cellular wireless communication systems, wherein different cellular base stations use different radio resources for the respective physical random access channels thereof, or at the very least, wherein the radio resource to be used depends on the geographical area wherein the terminal is located. The radio resource used by the permanent physical random access channels can therefore be stored beforehand by the terminal. Once this radio resource is stored, it is no longer necessary for the terminal to listen to a physical diffusion channel before emitting a random access message, since this radio resource is valid throughout the geographical region.

Consequently, such arrangements are particularly advantageous insofar as a terminal, whatever the position thereof in the geographical region, can always spontaneously emit a random access message by using the radio resource which is known initially. In other words, the random access base stations form a physical random access channel which is overall both in time (permanent) and in space (available throughout the geographical region).

In specific aspects of the disclosed embodiment, the wireless communication system can further comprise one or more of the following features, taken individually or according to any technically possible combinations.

In specific aspects of the disclosed embodiment, a terminal is configured to emit a random access message on the permanent physical random access channel, said random access message comprising a specific identification code of said terminal.

Thus, the random access message, i.e. the message by which the terminal is indicated to the random access base stations, makes it possible to identify, without ambiguity, the terminal having emitted said random access message, i.e. that it makes it possible to distinguish it from all the other terminals.

On the contrary, in the cellular wireless communication systems of the prior art, the random access message does not make it possible to identify, without ambiguity, the terminal having emitted it, and several messages must be exchanged, both on the upload link and on the download link to arrive at identifying, non-ambiguously, said terminal. This is explained in particular by the fact that, with the physical random access channels of the prior art not being permanent, the quantity of information included in the random access message is extremely limited, in order to make it possible for several terminals to emit a random access message during the time interval corresponding to said physical random access channel.

In the wireless communication system, which is the subject matter of the disclosed embodiment, the physical random access channel is permanent, such that the quantity of information included in the random access message can be greater, and can make it possible to identify, non-ambiguously, said terminal by means of one single message, even can make it possible to authenticate said terminal. By "one single message", this means that the terminal can be identified non-ambiguously (and, if necessary, authenticated) without having to exchange messages on the download link. The random access message can however be split into sub-messages emitted discontinuously as soon as there is no message emitted on the download link between the emissions by the terminal, of two sub-messages from the random access message.

In specific aspects of the disclosed embodiment, each cellular base station includes a temporary physical random access channel using a radio resource different from the radio resource of the permanent physical random access channel, the temporary physical random access channels of said cellular base stations using different radio resources.

In other words, the permanent physical random access channel, which is overall in time and in space, can be implemented by complementing the physical random access channels according to the prior art, for a limited duration, and which use different radio resources which depend on the geographical area, wherein the terminal is located.

In specific aspects of the disclosed embodiment, all or some of the cellular base stations are also random access base stations.

In specific aspects of the disclosed embodiment, all or some of the random access base stations form an access network called random access network, separate from the cellular access network, said random access network being connected to the cellular network core.

In specific aspects of the disclosed embodiment, the cellular base stations and the random access base stations of the random access network are configured to use different physical layer protocols for coordinated physical access channels and for permanent physical random access channels.

In specific aspects of the disclosed embodiment, the terminals and the random access base stations of the random access network are configured to exchange data in the form of ultra-narrow band radio signals.

In specific aspects of the disclosed embodiment, the wireless communication system comprises a cellular location server storing, for each terminal, an item of location information representative of the position of said terminal with respect to the cellular access network, and said cellular location server is configured to update the location information of a terminal according to a random access message emitted by said terminal on the permanent physical random access channel and received by a random access base station.

According to a second aspect, the disclosed embodiment relates to a method for managing mobility of a terminal of a wireless communication system according to any one of the aspects of the disclosed embodiment, said system comprising a cellular location server storing an item of location information representative of the position of said terminal with respect to the cellular access network. The method for managing mobility comprises:
  an emission, by the terminal, of a random access message on the permanent physical random access channel,
  a reception, by at least one random access base station, of the random access message emitted by said terminal,
  a determination of an item of updated location information from said terminal according to the random access message received from said terminal,
  an update, by the cellular location server, of the location information of the terminal stored in said cellular location server according to the updated location information.

Such arrangements are particularly advantageous, in that the location information of the terminal can be updated, without the terminal having to listen to the cellular access network.

In specific methods of implementation, the method for managing mobility can further comprise one or more of the following features, taken individually or according to any technically possible combinations.

In specific methods of implementation, the updated location information of the terminal is determined according to an item of location information of at least one random access base station having received said random access message.

In specific methods of implementation, the method for managing mobility comprises an evaluation, by the cellular location server, of a predefined mobility criterion of the terminal by comparing the updated location information with the location information stored by said cellular location server and, when the mobility criterion is verified:
  an emission, sent to the terminal, of access parameters to the cellular access network to be used for the current position of the terminal with respect to the cellular access network,
  a storing, by the terminal, of said cellular access network access parameters received.

In specific methods of implementation, the method for managing mobility comprises prior steps of connecting the terminal with the cellular access network and of putting a cellular communication module of said terminal into standby, and the random access message is emitted when said cellular communication module is on standby and when a predefined emission criterion, evaluated by the terminal, is verified.

In specific methods of implementation, the random access message comprises a specific identification code of said terminal.

BRIEF DESCRIPTION OF THE DRAWINGS

The disclosed embodiment will be best understood upon reading the following description, given as an example that is not at all limiting, and made by referring to the figures which represent.

In these figures, identical references from one figure to another designate identical or similar elements. To be clear, the elements represented are not to scale, except if mentioned otherwise.

DETAILED DESCRIPTION

Figure 1:
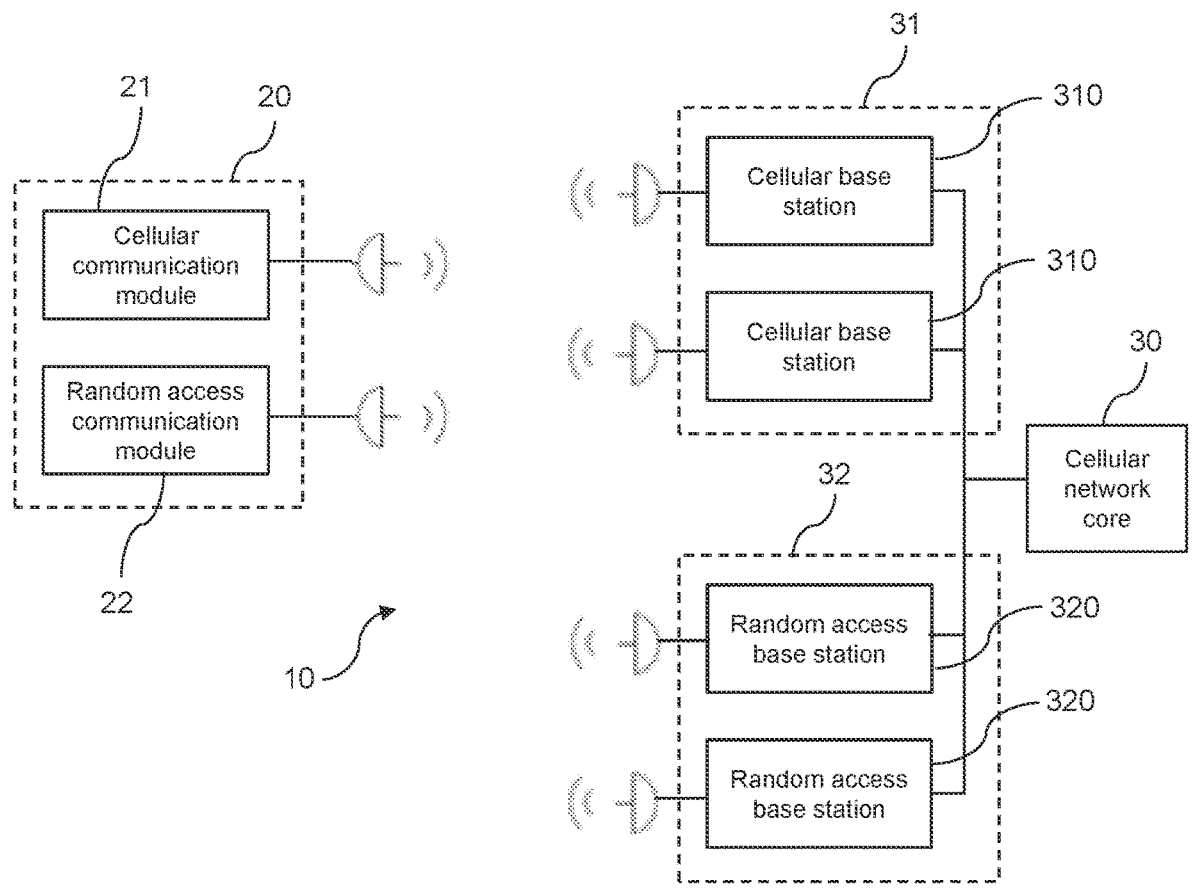
FIG. 1: a schematic representation of a preferred aspect of the disclosed embodiment of a wireless communication system.

FIG. 1 schematically represents a preferred aspect of the disclosed embodiment of a wireless communication system 10. Such as illustrated by FIG. 1, the wireless communication system 10 comprises a cellular access network 31 connected to a cellular network core 30.

The cellular access network 31 comprises a plurality of base stations 310 called cellular base stations. Each cellular base station 310 serves a predetermined geographical area Zg1, also known by the name of "cell", and the grouping of all of the geographical areas Zg1 served by the cellular base stations 310 forms a geographical region Rg.

Such as indicated above, a cellular access network 31 is of the wireless wide area network (WWAN) type, i.e. that the geographical region Rg served is of a significant area, typically greater than 10000 km$^2$, even greater than 50000 km$^2$.

The cellular base stations 310 are adapted to exchange data with terminals 20. Such as indicated above, the data exchanges between a terminal 20 and the cellular access network 31 are made on physical random access channels, called coordinated physical random access channels, i.e. that it is the cellular access network 31 and/or the cellular network core 30 which decide(s) when and with which radio resource the terminal 20 can exchange data with said cellular access network 31.

The cellular access network 31 is, for example, a GPRS, EDGE, UMTS, HSPA, HSPA+, LTE, CDMA2000 access network, etc. Generally, any type of cellular access network 31 can be used in the wireless communication system 10, as soon as it responds to the general principles of cellular access networks recalled above, namely of wireless wide area network type with a splitting into geographical areas (cells) of the geographical region served and exchange of data mainly on coordinated access physical channels. This includes, in particular, all current cellular access networks, but also the future evolutions thereof.

Below in the description, in a non-limiting manner, the case where the cellular access network 31 is of the Long Term Evolution (LTE) type is explored. In such a context, the cellular access network 31 is known by the name of Evolved-Universal Terrestrial Access Network (E-UTRAN), the cellular base stations 310 by the name of Evolved Node B (EnodeB), and the cellular network core 30 by the name of Evolved Packet Core (EPC).

The wireless communication system 10 also comprises, in preferred embodiments, a cellular location server (not represented in the figures) which belongs, for example, to the cellular network core 30. The cellular location server, known by the name of Mobility Management Entity (MME), in the case of an LTE access network, stores, for each terminal 20, an item of location information, representative of the position of said terminal with respect to the cellular access network 31. For example, the item of location information of a terminal 20 corresponds to an identifier of the last cellular base station 310 to which said terminal 20 is connected.

Such as illustrated by FIG. 1, the wireless communication system 10 also comprises a second wireless access network separate from the cellular access network 31 and connected to the cellular network core 30, designated below by "random access network 32".

The random access network 32 comprises base stations 320 called random access base stations which serve the same geographical region Rg as the cellular base stations 310.

Figure 2:
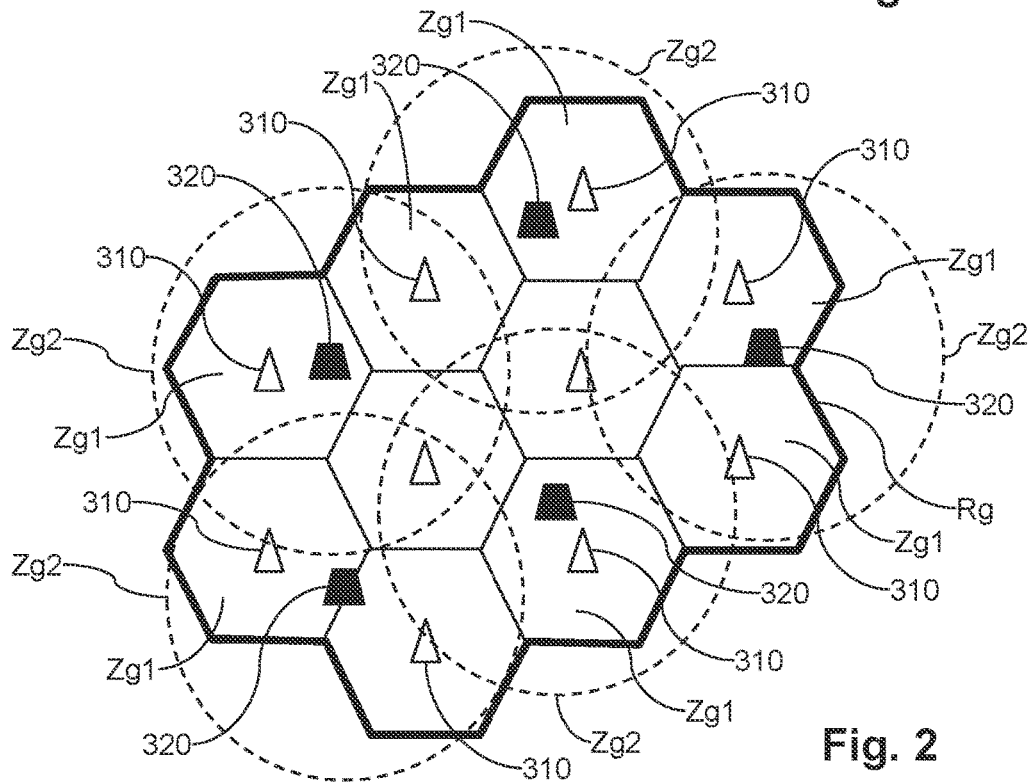
FIG. 2: a schematic representation of an example of geographically distributing cellular base stations of a cellular access network and random access base station of a random access network.

FIG. 2 schematically represents an example of geographical distribution of the cellular base stations 310 and random access base stations 320 in the geographical region Rg. Such as illustrated by FIG. 2, each random access base station 320 serves a predetermined geographical area Zg2, and the grouping of all of the geographical areas Zg2 covers the geographical region Rg.

Each random access base station 320 is adapted to receive data emitted by the terminals 20 on a permanent physical channel called physical random access channel. In other words, the permanent physical random access channel is available without interruption in time to receive, in particular random access messages emitted by the terminals 20.

Furthermore, the permanent physical random access channels of said random access base stations 320 use one same radio resource throughout the geographical region. By "radio resource", this means, for example, a predetermined frequency band or a predetermined frequency sub-band (for example, a carrier of an Orthogonal Frequency Division Multiple Access (OFDMA) signal), a spreading and/or scrambling code, etc.

Thus, the random access base stations 320 of the random access network 32 form a physical random access channel which is overall both in time, since it is permanent and available without interruption, but also in space, since the same radio resource is used throughout the geographical region (the radio resource to be used is independent of the geographical area Zg1, Zg2, wherein a terminal 20 is located). Consequently, each terminal 20, whatever the position thereof in the geographical region Rg, can always spontaneously emit a random access message by using this radio resource, which is known initially.

It must be noted, that by "random access", this means that the access to the radio resource used by all the permanent physical random access channels is not coordinated by the random access network 32. It is, on the contrary, the terminals 20 which decide by themselves, without prior authorisation from said random access network 32, when they emit a random access message on a permanent physical random access channel. For example, the method for accessing the permanent physical random access channels is of the Aloha or Carrier Sense Multiple Access (CSMA) type, etc.

With said physical random access channels being permanent, the multiplexing of the terminals 20 on said permanent physical random access channels is mainly temporal. However, nothing excludes coupling the temporal (statistical) multiplexing to another type of multiplexing.

For example, the radio resource used by all the permanent physical random access channels can be a predetermined frequency band of width $\Delta F$ (for example, of around a few hundred kilohertz) a lot greater (at least by a factor of 10) than the frequency width $\delta F$ of the random access messages emitted by the terminals 20. In such a case, it is possible for the terminal 20 to furthermore select, randomly, a specific frequency sub-band of width $\delta F$, inside the frequency band, to emit a random access message. If necessary, the terminals 20 are also multiplexed in frequencies (statistically), inside said frequency band of width $\Delta F$.

According to another example, one same predetermined set of different spreading or scrambling codes can be used by all the permanent physical random access channels. In such a case, it is possible for the terminal 20 to furthermore randomly select a spreading or scrambling code, from among the predetermined set of spreading or scrambling codes, to emit a random access message. If necessary, the terminals 20 are also multiplexed in codes (statistically) from among the predetermined set of spreading or scrambling codes.

It must furthermore be noted, that the current cellular access networks generally already have physical random access channels. For example, in an LTE access network, each cellular base station 310 implements a physical random access channel (PRACH). However, contrary to the permanent physical random access channels of the random access network 32, the physical random access channels PRACH are temporary (i.e. non-permanent such that they require a temporal synchronisation of the terminals with the cellular base stations 310) and use different radio resources, i.e. that the radio resource to be used depends on the cellular base station 310 in the geographical area Zg1 of which the terminal 20 is located. To emit on a physical random access channel PRACH of the cellular access network 31, a terminal 20 must therefore necessarily listen beforehand to a physical diffusion channel emitted by the cellular base station 310, to be temporally synchronised with it and to learn the parameters of said physical random access channel PRACH (temporal location of the time interval and radio resource reserved for the random access messages).

In the example illustrated by FIG. 1, wherein the random access base stations 320 belong to a random access network 32 separate from the cellular access network 31, the cellular base stations 310 and the random access base stations 320 are preferably configured to use different physical layer protocols, and each terminal 20 comprises two separate communication modules:

- a cellular communication module 21 adapted to exchange data with the cellular base stations 310, and
- a random access communication module 22 adapted to exchange data with the random access base stations 320.

For example, the cellular access network 31 is an LTE access network and the random access network 32 is an ultra-narrow band access network. By "ultra-narrow band" or UNB, this means that the instantaneous frequency spectrum of the signals exchanged (including random access messages) between the terminals 20 and the random access network 32 is of frequency width less than two kilohertz, even less than one kilohertz. The emission of such signals can be achieved with a highly reduced electrical consumption. Furthermore, it is possible with such signals to achieve a frequency multiplexing (statistical) of numerous terminals 20 in a frequency band of width ΔF of a few hundred kilohertz.

In the example illustrated by FIG. 1, the random access network 32 (for example, UNB) therefore complements the cellular access network 31 (for example, LTE) to add to it a physical random access channel, overall in time and in space.

The permanent physical random access channel provided by the random access base stations 320 has numerous applications, and can be used, in particular to manage the mobility of a terminal 20 with respect to the cellular access network 31, or also to examine said cellular access network 31 and/or the cellular network core 30 to know if the terminal 20 must establish a physical access channel, coordinated with the cellular access network 31 to receive data, etc.

Figure 3:
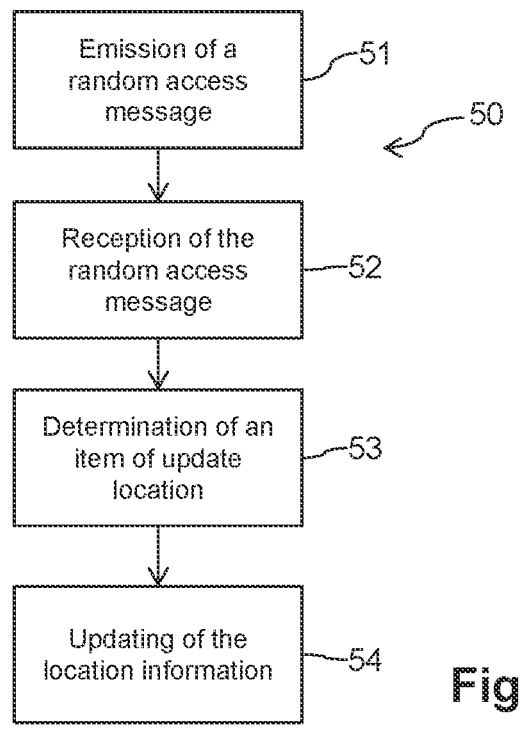
FIG. 3: a diagram illustrating the main steps of an example of implementing a method for managing mobility of a terminal in a wireless communication system.

FIG. 3 schematically represents the main steps of a method 50 for managing mobility of a terminal 20 in a wireless communication system 10 such as described above. Such as illustrated by FIG. 3, the method 50 for managing mobility comprises steps of:

- 51 emission, by the terminal 20, of a random access message on the permanent physical random access channel,
- 52 reception, by at least one random access base station 320, of the random access message emitted by said terminal 20,
- 53 determination of an item of updated location information of said terminal 20 according to said random access message received from said terminal 20,
- 54 updating, by the cellular location server, of the location information of the terminal 20 stored in said cellular location server according to the updated location information.

Thus, the random access message emitted by the terminal 20 and received by at least one random access base station 320 is used to update the location information of the terminal 20 stored in the cellular location server.

For example, if the terminal 20 is equipped or connected to a geolocation module, for example of Global Positioning System (GPS) type, thus the terminal 20 can include directly in the random access message, the position thereof such as determined by the geolocation module. Once said random access message received by a random access base station 320, said position can be extracted from the random access message to determine the updated location information of said terminal 20.

According to another example, it is possible to determine the updated location information of the terminal 20 according to an item of location information of at least one random access base station 320 having received said random access message.

Indeed, the location information of a random access base station 320, which is representative of the position of said random access base station 320, makes it possible to deduce, during the step 53, a cellular base station 310 which is located in the proximity of said random access base station 320 having received the random access message. An identifier of this cellular base station 310 is, for example, used as updated location information of said terminal 20.

More generally, any location information representative of the position of a random access base station 320 can be used to determine the updated location information of the terminal 20. For example, it is possible to store an associating table, at each random access base station 320, one or more cellular base stations 310 being located in the proximity of said random access base station 320. In such a case, the location information of the random access base station 320 corresponds directly to an identifier of this random access base station.

It must also be noted, that the random access message emitted by the terminal 20 can be received by several random access base stations 320. In this case, it is possible, during the step 53, to use the location information of several random access base stations 320 in order to identify, for example, a cellular base station 310 being located at the intersection of geographical areas of at least two of said random access base stations 320 having received the random access message. Alternatively, it is possible to use the location information of several random access base stations 320 having received the random access message, as well as parameters for receiving said random access message by each of these random access base stations 320 (reception power level, moment of reception, frequency of reception, etc.) to conventionally estimate the position of said terminal 20. The estimated position of said terminal 20 is thus used to determine the updated location information of said terminal 20.

In preferred aspects of the disclosed embodiment, the random access message emitted by a terminal 20 on the permanent physical random access channel comprises a specific identification code of said terminal 20, i.e. a unique identification code, making it possible to distinguish said terminal 20 from all the other terminals 20. Consequently, the terminal 20 can be identified by means of a single message, in this case, the random access message by which the terminal 20 initiates the random access procedure.

The random access message can also comprise information making it possible for the random access network 32 to authenticate said terminal 20. If necessary, the terminal 20 can be both identified and authenticated by means of a single random access message, which makes it possible to greatly limit the exchanges of messages to be created by the terminal 20, and therefore contributes to limiting the electrical consumption thereof.

In the case of the method 50 for managing mobility, it is therefore thus possible to update the location information of a terminal 20 with respect to the cellular access network 31 by means of a single random access message emitted by this terminal 20 on the permanent physical random access channel. As a comparison, in the case of a "location update" procedure, according to the prior art, it is sometimes necessary to exchange ten messages in total, on the download link and the upload link of the cellular access network 31, to be able to update the location information.

It must furthermore be noted, that this update is furthermore carried out without any interaction between the terminal 20 and the cellular access network 31, and can therefore be carried out by conserving the cellular communication module 21 of said terminal 20 in standby mode. The method 50 for managing mobility can therefore be implemented, in particular, complementarily to the PSM approach described above, in order to benefit from the advantages of it in terms of electrical consumption while improving the management of the mobility of the terminals 20 with respect to the cellular access network 31. The terminal 20 uses, for this purpose, the random access communication module 22 (for example, UNB), which advantageously has an electrical consumption less than that of the cellular communication module 21.

Preferably, the emission step 51, by the terminal 20 is executed at the discretion of said terminal 20, and only when a predetermined emission criterion evaluated by the terminal 20 is verified. In other words, it is the terminal 20 which controls the updating of the location information, and which decides by itself when to emit the random access message. The terminal 20 controls the electrical consumption associated with the updating of the location information stored in the cellular location server.

Different type of emission criteria can be considered, and selecting a specific emission criterion only constitutes a variant of implementation. For example, the emission criterion can be considered as verified:
- when a predefined emission period expires after the emission of the preceding random access message, and/or
- when the terminal 20, for example equipped with an accelerometer or any other movement detection means, detects that it has moved, etc.

Figure 4:
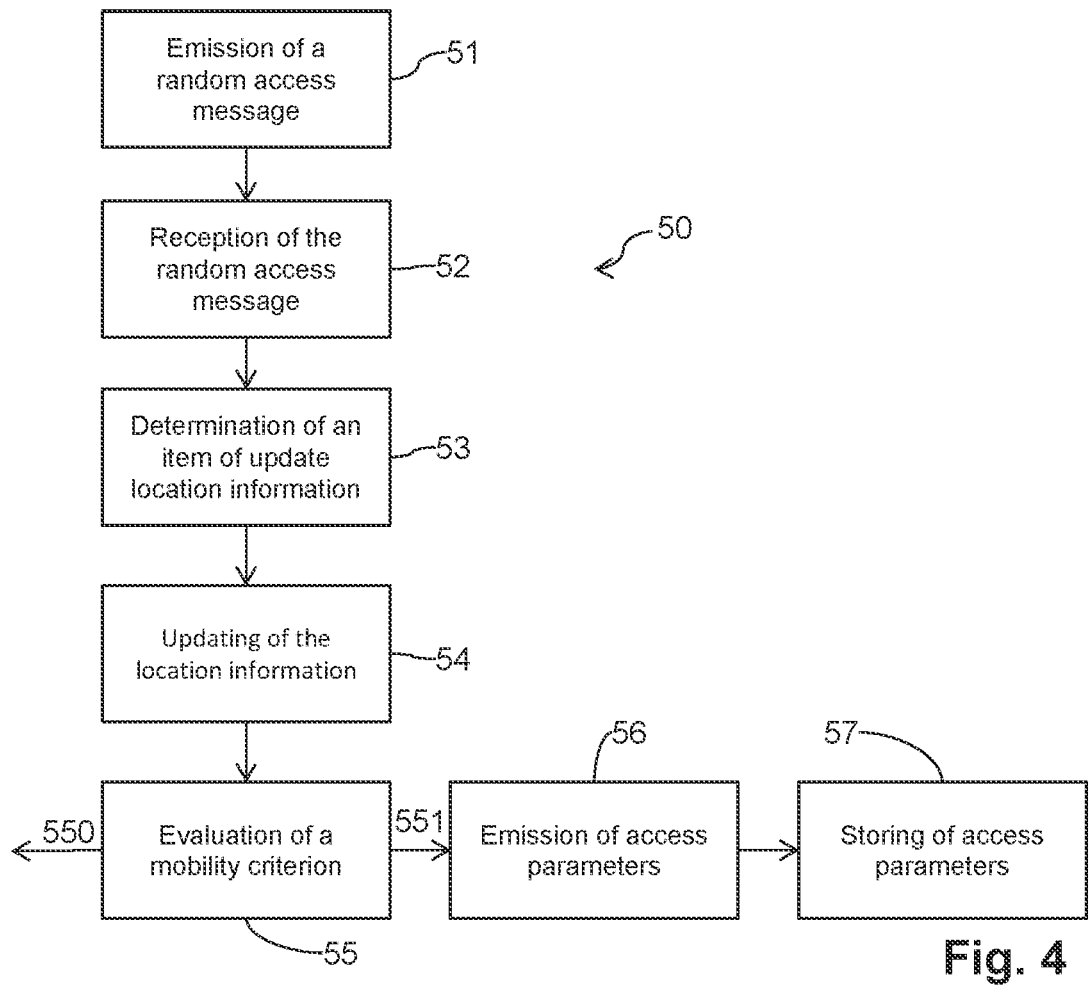
FIG. 4: a diagram illustrating the main steps of a preferred method of implementing a method for managing mobility.

FIG. 4 schematically represents the main steps of a preferred method of implementation of method 50 for managing mobility. Furthermore, the steps described in reference to FIG. 3, the method 50 for managing mobility comprises an evaluation step 55, by the cellular location server, of a predefined mobility criterion of the terminal 20 by comparing the updated location information with the location information stored by said cellular location server. When the mobility criterion is not verified (reference 550 in FIG. 4), the method 50 for managing mobility can be stopped. On the contrary (reference 551 in FIG. 4), the method 50 for managing mobility comprises steps of:
- 56 emitting, sent to the terminal 20, of new parameters for accessing the cellular access network 31 to be used for the current position of the terminal 20 with respect to the cellular access network 31,
- 57 storing, by the terminal 20, of said parameters for accessing the cellular access network received.

The evaluation of the mobility criterion aims mainly to determine if the terminal 20 is moved in the geographical area Zg1 of a cellular base station 310 different from the last cellular base station 310 to which said terminal 20 is connected. Different types of mobility criteria can be considered, and selecting a specific mobility criterion only constitutes a variant of implementation. For example, the mobility criterion can be considered as verified:
- as soon as the updated location information differs from the location information stored beforehand in the cellular location server, or
- when the terminal 20 is moved in the geographical area of a cellular base station 310 which is not in the vicinity of the last cellular base station 310 to which said terminal 20 is connected, etc.

The parameters of accessing the cellular access network 31 emitted, sent to the terminal 20 correspond to any type of information making it possible to accelerate the connection of said terminal 20 to the cellular base station 310 in the geographical area Zg1 from which said terminal 20 is moved, in particular awakening the cellular communication module 21 from said terminal 20, if it was in standby mode during the movement. For example, the access parameters can comprise:
- the updated location information of the terminal 20, and/or
- an item of information on a radio resource used by a physical diffusion channel of the cellular base station 310 in the geographical area Zg1 from which the terminal 20 is moved,
- one or more items of information diffused on the physical diffusion channel, in particular that which aims to control the access on the physical random access channel PRACH (for example, a minimum reception power level to be verified before emitting on the physical random access channel PRACH and/or a maximum emission power level to be respected on said physical random access channel PRACH, etc.), etc.

The access parameters are emitted by the random access network 32 and/or by the cellular access network 31. For example, if the quantity of information represented by the access parameters is low, they can be emitted, sent to the terminal 20 by a random access base station 320. On the contrary, they are preferably emitted by a cellular base station 310. If necessary, if the cellular communication module 21 of the terminal 20 is in standby mode, it is possible to emit, by means of a random access base station 320, an awakening message, sent to said terminal 20. When it receives an awakening message, the terminal 20 activates the cellular communication module 21 to receive the access parameters via a cellular base station 310 of the cellular access network 31.

More generally, it must be noted, that the methods of implementation and embodiments considered above have been described as non-limiting examples, and that other variants are consequently considerable.

In particular, the disclosed embodiment has been described by mainly considering the case where the random access base stations 320 are used to manage mobility of the terminal 20. However, and such as indicated above, other applications can be considered. In particular, the emission of a random access message on the permanent physical random access channel by a terminal 20 can be used to request to the cellular access network 31 and/or to the cellular network core 30 if data is expected to be transmitted there, sent to said terminal 20. If necessary, if the cellular communication module 21 of the terminal 20 is in standby mode, it is possible to emit, by means of a random access base station 320, an awakening message, sent to said terminal 20. When it receives an awakening message, the terminal 20 activates the cellular communication module 21 to receive said data. The emission of the awakening message by the random access network 32 replaces, in this case, the physical "paging" channel of the cellular access network 31 such that, with respect to the eDRX approach described above, the terminal 20 can control the delay for establishing an incoming call by the emission of a random access message, sent to the random access network 32.

Furthermore, the disclosed embodiment has been described by considering the case where the random access base stations 320 belong to a random access network 32 separate from the cellular access network 31. Nothing excludes, according to other examples, having all or some of the cellular base stations 310 which are also random access base stations 320. A cellular base station 310 which is also a random access base station 320 therefore comprises both a temporary physical random access channel and a permanent physical random access channel.

Also, the disclosed embodiment has been described by considering that the geographical region Rg corresponds to the whole geographical region served by the cellular access network 31. However, the disclosed embodiment is applicable generally to any geographical region of significant area formed by several geographical areas, wherein the temporary physical random access channels use different radio resources.

What is claimed is:

1. A wireless communication system comprising a cellular access network connected to a cellular network core, said cellular access network comprising base stations called cellular base stations adapted to exchange data with terminals on physical channels called coordinated access channels, each cellular base station serving a geographical area, all of the geographical areas served by said cellular base stations forming a geographical region, wherein the wireless communication system comprises base stations called random access base stations serving the geographical region served by the cellular access network, each random access base station being adapted to receive data emitted by terminals on a permanent physical channel, existing continuously, without interruption in time, called random access channel, the permanent physical random access channels of said random access base stations using one same radio resource throughout the geographical region and the permanent physical random access channels are configured such that a terminal transmits a random access message at any time without the need for time synchronization between the terminal and a random access base station.

2. The system according to claim 1, wherein a terminal is configured to emit a random access message on the permanent physical random access channel, said random access message comprising a specific identification code of said terminal.

3. The system according to claim 1, wherein all or some of the cellular base stations are also random access base stations.

4. The system according to claim 1, wherein all or some of the random access base stations form an access network called random access network, separate from the cellular access network, said random access network being connected to the cellular network core.

5. The system according to claim 4, wherein the cellular base stations and the random access base stations of the random access network are configured to use different physical layer protocols for the physical coordinated access channels and for the permanent physical random access channels.

6. The system according to claim 4, wherein the terminals and the random access base stations of the random access network are configured to exchange data in the form of ultra-narrow band radio signals.

7. The system according to claim 1, comprising a cellular location server storing, for each terminal, an item of location information representative of the position of said terminal with respect to the cellular access network, said cellular location server being configured to update the location information of a terminal according to a random access message emitted by said terminal on the permanent physical random access channel and received by a random access base station.

8. A method for managing mobility of a terminal of a wireless communication system according to claim 1, said system comprising a cellular location server storing an item of location information representative of the position of said terminal with respect to the cellular access network, wherein the method comprises:
an emission, by the terminal, of a random access message on the permanent physical random access channel,
a reception, by at least one random access base station, of the random access message emitted by said terminal,
a determination of an item of updated location information of said terminal according to the random access message received from said terminal, and
an updating, by the cellular location server, of the location information of the terminal stored in said cellular location server according to the updated location information.

9. The method according to claim 8, wherein the updated location information of the terminal is determined according to an item of location information of at least one random access base station having received said random access message.

10. The method according to claim 8, comprising an evaluation, by the cellular location server, of a predefined mobility criterion of the terminal by comparing the updated location information with the location information stored by said cellular location server and, when the mobility criterion is verified:
an emission, sent to the terminal, of parameters for accessing the cellular access network to be used for the current position of the terminal with respect to the cellular access network, and
a storing, by the terminal, of said parameters for accessing the cellular access network received.

11. The method according to claim 8, comprising prior steps of connecting the terminal with the cellular access network and putting a cellular communication module of said terminal into standby, the random access message being emitted when said cellular communication module is on standby and when a predefined emission criterion, evaluated by the terminal, is verified.

12. The method according to claim 8, wherein the random access message comprises a specific identification code of said terminal.

* * * * *